United States Patent [19]
Nola

[11] 4,439,718
[45] Mar. 27, 1984

[54] MOTOR POWER CONTROL CIRCUIT FOR A.C. INDUCTION MOTORS

[75] Inventor: Frank J. Nola, Huntsville, Ala.

[73] Assignee: The United States of America as represented by the Administrator of the National Aeronautics and Space Administration, Washington, D.C.

[21] Appl. No.: 297,524

[22] Filed: Aug. 28, 1981

[51] Int. Cl.³ .............................................. H02P 5/40
[52] U.S. Cl. .................... 318/729; 318/812
[58] Field of Search ................ 318/729, 811, 812

[56] References Cited

U.S. PATENT DOCUMENTS

| | | | |
|---|---|---|---|
| 3,497,779 | 2/1970 | Eisele | 318/611 |
| 4,052,648 | 10/1977 | Nola | 318/810 |
| 4,229,690 | 10/1980 | Avidan | 323/242 |
| 4,361,792 | 11/1982 | Davis, Jr. et al. | 318/729 |
| 4,387,329 | 6/1983 | Harlow | 318/729 |
| 4,388,578 | 6/1983 | Green et al. | 318/729 |

OTHER PUBLICATIONS

"Improved Power Factor Controller", N.A.S.A., G. G. Marshall, Space Flight Center, NASA Tech. Briefs, Summer 1980, vol. 5, No. 2, MFS-25323.

*Primary Examiner*—David Smith, Jr.
*Attorney, Agent, or Firm*—Joseph H. Beumer; John R. Manning; Leon D. Wofford, Jr.

[57] ABSTRACT

A motor power control of the type which functions by controlling the power factor wherein one of the parameters of power factor current "on" time is determined by the "on" time of a triac through which current is supplied to the motor, and wherein, by means of a positive feedback circuit, a wider range of control is effected.

10 Claims, 2 Drawing Figures

MOTOR POWER CONTROL CIRCUIT FOR A.C. INDUCTION MOTORS

ORIGIN OF THE INVENTION

The invention described herein was made by an employee of the U.S. Government and may be manufactured and used by or for the government of the United States for governmental purposes without the payment of any royalties thereon or therefor.

TECHNICAL FIELD

This invention relates generally to motor control circuits for induction motors, and particularly to one which controls the power input to an A.C. induction motor by requiring it to operate with a fixed power factor.

BACKGROUND ART

In previous patent applications, now U.S. Pat. Nos. 4,052,648 and 4,266,177, the applicant described power control systems for induction motors wherein the phase angle between current and voltage, or power factor, was controlled. In those systems, there were two features which were, to an extent, objectionable. One was that in order to determine the phase angle of motor current with respect to motor voltage, a resistor had to be placed in the current path to the motor, and this, in addition to creating a power loss, was inconvenient in that different sized resistors were required for different sized motors. The second objectionable features was that while the greatest improvement in power savings was achieved with a maximum value of selected power factor, this reduced the capability of a motor to adequately respond to suddenly applied loads.

It is the object of this invention to overcome both of these difficulties.

DISCLOSURE OF THE INVENTION

In accordance with this invention, in addition to the development of a power factor error signal which is amplified to provide a control input signal to a triac furnishing power to a motor, a portion of this triac input signal is coupled as positive feedback to the error signal. This enhances the load response of a motor, enabling it to be successfully operated at a higher, more efficient, power factor.

As a further feature of the invention, instead of sampling motor current directly to determine the "on" time of current, it is determined by detecting the "on" and "off" times of the triac, which necessitates only sensing voltage across the triac. This follows since the drop to zero of triac voltage marks the "on" time of the turn'on of current, and the following rise of triac voltage marks the turn-off time of current.

DETAILED DESCRIPTION OF THE DRAWINGS

Figure 1:
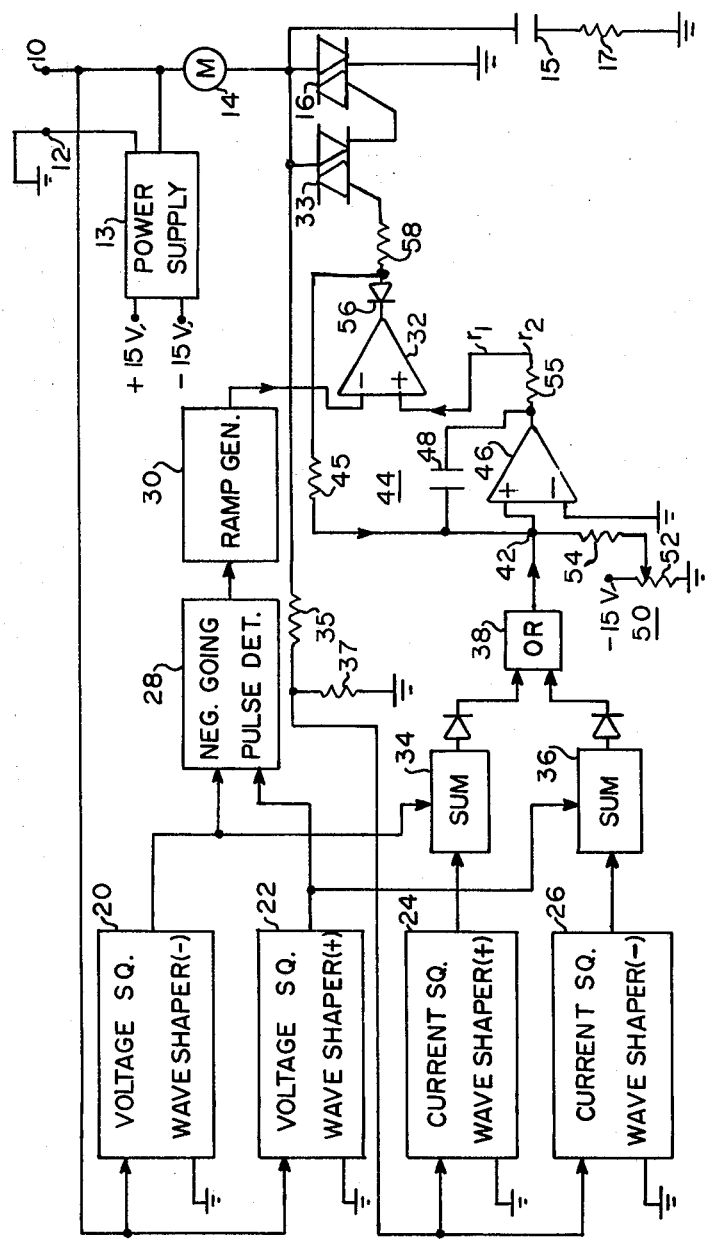
FIG. 1 is an electrical schematic diagram of an embodiment of the invention.

Referring to FIG. 1, an alternating current source (115-volts, 60 Hz A.C. and shown as waveform a of FIG. 2) is connected across terminals 10 and 12. Power supply 13 is connected to these terminals, and it provides plus and minus 15 volts D.C. for operation of the circuitry shown in FIG. 1. Induction motor 14 is connected between A.C. power terminal 10 and through triac 16 to the circuit ground, which in turn is connected to A.C. terminal 12. In this fashion, induction motor 14 is powered by an A.C. line voltage (waveform a of FIG. 2) through triac 16, whereby the power input to motor 14 (illustrated by voltage waveform b and current waveform c) is controlled, control being by means of the circuitry shown herein, and wherein by requiring motor 14 to operate with a selected power factor, the power input to the motor is automatically regulated in accordance with the load applied to it. The voltage across triac 16 for the corresponding condition of waveform c is shown in waveform d. A conventional triac snubber circuit consisting of capacitor 15 and resistor 17 is connected across triac 16.

Figure 2:
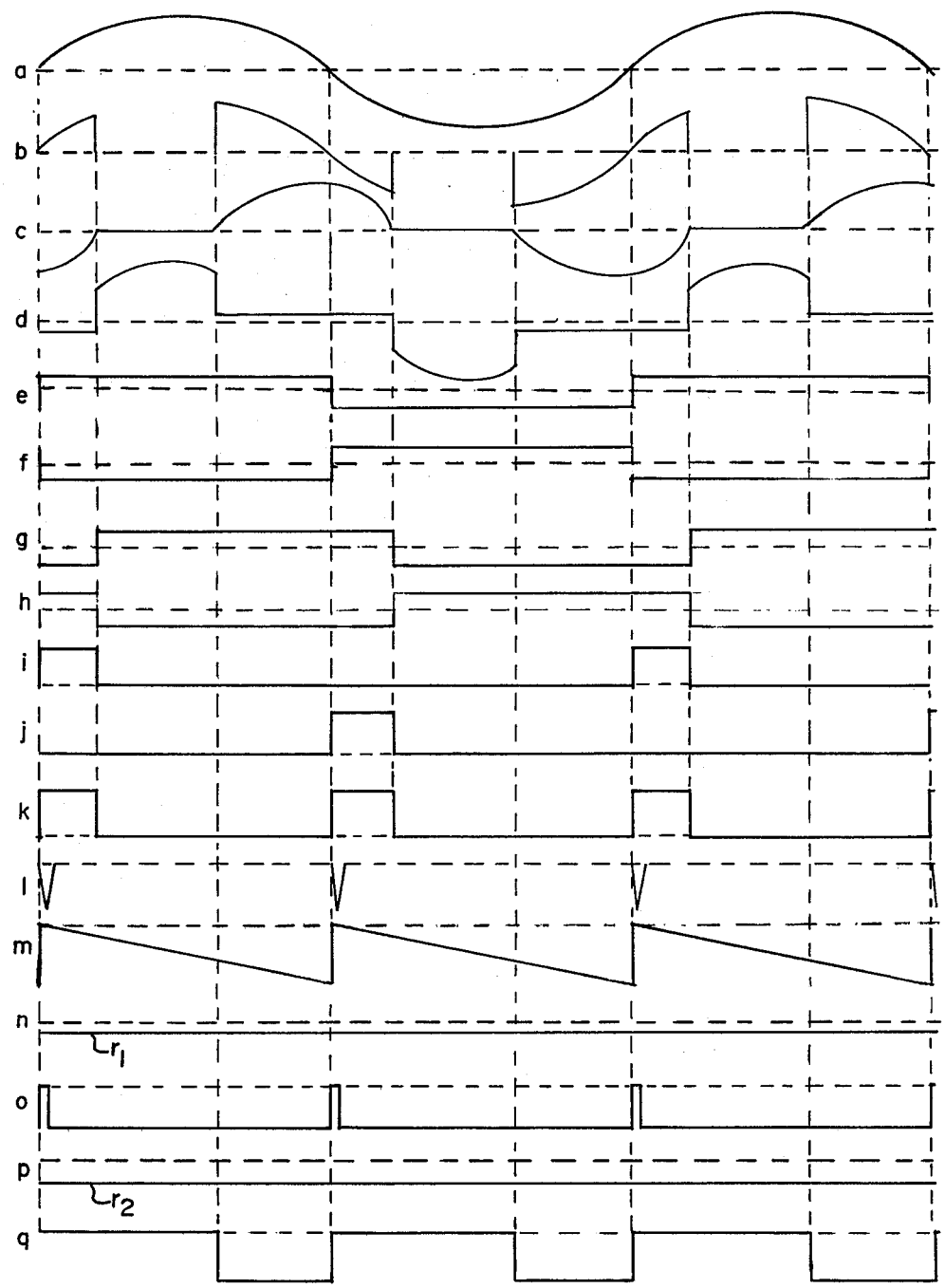
FIG. 2 shows a series of waveforms illustrating aspects of operation of the invention.

To examine the control circuitry, the A.C. voltage, which is applied to induction motor 14, is also supplied to the inputs of voltage square wave shapers 20 and 22, shaper 22 providing a first phase, full wave, rectangular wave outut as shown in waveform e of FIG. 2, and shaper 22 providing a second, oppositely phased, full wave, rectangular wave output as shown in waveform f of FIG. 2. One output of each of voltage square wave shapers 20 and 22 is fed to negative going pulse detector 28, which provides a negative spike output (waveform 1 of FIG. 2). Spike pulses are then fed to ramp generator 30, which provides a ramp waveform each half cycle of the A.C. input as shown in waveform m of FIG. 2. This ramp waveform is applied to the plus, non-inverting, input of differential or operational amplifier 32 which functions as a zero crossing detector responsive to the combination of the ramp waveform and a power factor error signal (to be further described) supplied to the negative, inverting, input of amplifier 32. In turn, amplifier 32 provides a variable width control signal output for the turn "on" of triac 33, and thereby triac 16, at a point which maintains the power factor of motor 14 at a commanded level.

To examine the development of the control signal, the two oppositely phased square wave signals (waveforms e and f) from square wave shapers 20 and 22 are provided as a basis for voltage "on" time references each half cycle, or 120 cycles per second, for the development of voltage references at this rate for comparison, at the same rate, with the "on" time square wave signals representative of current "on" time and thereby the development of a signal representative of the operating power factor of motor 14. As one feature of this invention, the "on" time current signals are obtained by sensing the voltage across triac 16, it being noted in waveform c, showing motor current, and waveform d, showing triac voltage, that the trailing edge of one polarity portion of triac voltage marks the turn "on" of a current half cycle, and the leading edge of the next, opposite, polarity portion of triac voltage marks the turn "off" of that current half cycle. Sensing of triac voltage is accomplished by a voltage divider circuit consisting of resistors 35 and 37 connected across triac 16. The portion of triac voltage appearing across resistor 37 is provided as an input signal to current square wave shapers 24 and 26 which provide as outputs oppositely phased square waves as shown in waveforms g and h, respectively.

The operating power factor signal is derived from a motor voltage/current phase angle, and the latter is obtained by the following process. The positive outputs of voltage square wave shaper 20 and current wave shaper 24 are summed in summing device 34 to provide a pulse output as shown in waveform i of FIG. 2, and the positive outputs of voltage square wave shaper 22 and current square wave shaper 26 are summed in summing device 36 to provide a pulse output as shown in waveform j of FIG. 2. These two waveforms are combined by OR circuit 38 as shown in waveform k of FIG. 2 and, as combined, they are applied to summing junction 42 as an operating power factor signal.

By examing the process of forming of waveforms i and j, it will be noted that each is turned "on" responsive to the turn "on" of a voltage half cycle and turned "off" by the next following the turn "off" of a current half wave cycle. Thus, the pulses each have a width proportional to the phase angle between motor current and voltage, and occur at 120 cycle rates. The power factor is, of course, the cosine of the phase angle, and thus varies inversely with the phase angle. Accordingly, an increase in phase angle is indicative of a decrease in power factor, and vice versa.

A control circuit signal is developed by the algebraic summing of a selected D.C. negative power factor control voltage with an integrated version of positive operating power factor signal (waveform k), this being done by applying a command voltage and a power factor signal to summing junction 42, which is an input to operational amplifier 46 connected as integrator 44.

The command voltage is provided by command voltage circuit 50 which consists of potentiometer 52, across which is connected a negative 15-volt source. A selected portion of this voltage is provided by a resistor 54 connected between the movable arm of potentiometer 52 and summing junction 42. The effect of the summing of the voltages is that, as will be further described, the "on" time of triac 16 is regulated as an inverse function of the value of the operational power factor signal voltage compared to the power factor command voltage in the manner described.

The command voltage from circuit 50 is set with motor 14 unloaded and by adjustment of potentiometer 52. A power factor (or phase angle between current and voltage) is determined by choosing the greatest power factor (smallest motor current/phase difference) at which the motor will operate over a range of loads to be encountered.

The combination or sum of the command signal and power factor operating signal on summing junction 42 is applied to the inverting input of operational amplifier 46. Amplifier 46 is connected and operated as an integrator 44 by virtue of a capacitor 48 being connected between the output and inverting input of the amplifier. The positive or non-inverting input of operational amplifier 46 is connected to ground. Integrator 44 effectively smooths the pulse type operating power factor signal, and the combined signals are amplified and appear at the output of operational amplifier 46 as a negative control signal which shifts positively responsive to the presence of a higher than commanded power factor (indicated by equivalent smaller voltage/current phase angle) and shifts negatively when there is detected a lower than commanded power factor.

The control signal from the output of operational amplifier 46 is coupled through resistor 55 and is applied to the negative (inverting) input of operational amplifier 32, the ramp signal of waveform m being applied to the positive or non-inverting input of operational amplifier 32 as described above. The control signal has the effect of varying the response of operational amplifier 32. Thus, with a basically zero level control signal, represented by reference line R1 of waveform n, the output of operational amplifier 32 will be essentially held negative by the ramp signal, resulting in a triggering output pulse shown by waveform o of amplifier 32, which stays on for all or essentially all of each full half cycle. This would typically be the case where a motor were operated at a low power factor setting, or would be the case for a basically fully loaded motor operating at a higher power factor.

In contrast, a typical value for a less than loaded motor is represented by reference line R2 of waveform p, the relative position of R2 with respect to the ramp signal being such that operational amplifier 32 would be triggered "on" during the latter portion of each ramp signal (waveform m), commencing with the intersection of the ramp signal with reference line R2. This produces an output pulse from operational amplifier 32 as indicated in waveform q shown with approximately 50% of time and representative of the turn "on" state of triac 16.

The output of operational amplifier 32 is applied through diode 56 and resistor 58 as a negative pulse (e.g., waveforms o and q) to the gate input of triggering or buffer triac 33, and its output is connected to the trigger input of triac 16 which actually determines the duty cycle of power input each half cycle to motor 14. Accordingly, as an example, triac 16 is turned "on" each half cycle of the A.C. circuit for the pulse width of the negative pulse shown in waveform q for about 50% of the time of each half cycle of the A.C. input to motor 14. This turn "on" state of triac 16 is illustrated in waveform d and would typically occur for a medium loading of motor 14 as described. If motor load should increase, this would be detected by a decreased voltage/current phase angle or increased power factor, and thus a positive going voltage (lesser negative value as illustrated by waveform o) from integrator 44 would be applied to operational amplifier 32. This produces an earlier turn "on" of trigger triac 33 and provides an increase in power input via triac 16 to motor 14 to a level which returns the power factor to the commanded level.

Then, if the load on motor 14 is shifted down, there will occur an inherent increase in voltage/current phase (reduced operating power factor), and the opposite would occur, that is, the input to the motor would be decreased to a level which would produce the selected power factor. The net result is that when motor 14 is less than fully loaded, it is driven by a substantially lower average voltage, and thereby it draws substantially less power than would have been the case had a factor control system not been employed.

While the system thus far described enables a very substantial decrease in the power consumed by an induction motor where there are significant periods wherein the motor is not fully loaded, it has been determined that the full potential of this type system has not been realized by the circuitry thus far described. This is because when the commanded power factor is set to the highest level at which which the motor will operate unloaded, often the control system will be insufficiently responsive to respond to a suddenly imposed load on the motor. In such case, the motor may stall.

Accordingly, as a feature of this invention, this problem has been solved. It has been solved by a positive feedback loop wherein the variable width negative pulse from operational amplifier 32 is coupled through resistor 45 to summing junction 42. Noting that this feedback pulse is of a negative polarity, it is of the same polarity as the command voltage, and of the opposite polarity to the operating power factor signal. With this fed back signal summed with the other two signals, the effect is to increase the response of operational amplifier 46 adequately to create a change in control voltage level applied to the inverting input of operational amplifier 46 to cause a greater pulse width output of operational amplifier 32 upon an increased load being applied to motor 14. This effectively prevents motor stalling when the power factor set by command voltage device 50 is set to a point quite close to the stalling point of motor 14 without load. Thus, it is believed that essentially the full potential for power savings with a factor type control system has been achieved.

I claim:

1. A power control system for an alternating current input to a load of the type which produces a phase difference between the load current and voltage waveforms, said system comprising:
   means associated with the load circuit of the load for producing a first output signal related to the current flow through the load;
   means connected to the load circuit of the load for producing a second output signal related to the voltage applied to the load;
   means responsive to said first and second signals for producing a phase difference output signal proportional to the phase difference between the load current and load voltage;
   means generating a preselected power factor command signal;
   thyristor switching means connected in series with the load circuit of said load for controlling the power supplied to the load; and
   control circuit means, responsive to said power factor command signal and said phase difference output signal, for generating control pulses for controlling switching of said switching means, said means for producing said first output signal comprising means for sensing the voltage waveform of said switching means and producing said first output signal responsive thereto.

2. A power control system as claimed in claim 1 wherein said thyristor switching means comprises at least one triac and said voltage waveform sensing means senses the voltage across said at least one triac.

3. A power control system as claimed in claim 2 wherein said voltage sensing means comprises a resistor connected to the output of said triac in shunt with the said triac.

4. A power control system as claimed in claim 2 wherein said voltage waveform sensing means comprises a voltage divider network connected to the output of said at least one triac.

5. A power control system as claimed in claim 2 wherein said load comprises an A.C. motor and said system further comprises feedback means for feeding back said control pulses to an input of said control circuit means to be algebraically summed with said command signal and said phase difference output signal such that an increase is provided in the duration of the control pulses produced by said control circuit means with increased loading of said motor.

6. A power control system for an A.C. motor, said system comprising:
   means connected to the motor circuit of said motor for producing a first output signal related to the current flow through said motor;
   means connected to the motor circuit of said motor for producing a second output signal related to the voltage applied to said motor;
   means responsive to said first and second signals for producing a phase difference output signal proportional to the phase difference between the motor current and motor voltage;
   means for generating a predetermined power factor command signal;
   thyristor switching means connected in series with said motor circuit of said motor for controlling the power supplied to said motor;
   control circuit means, responsive to said power factor command signal and said phase difference output signal, for generating control pulses for controlling switching of said switching means;
   and feedback means for feeding back said control pulses to an input of said control circuit means so as to be algebraically summed with said command signal and said phase difference output signal such that an increase is provided in the duration of the control pulses produced by said control circuit means with an increase in loading of said motor.

7. A power control system as claimed in claim 6 wherein said control pulse comprises a variable width negative pulse of the same polarity as said power factor command signal and is added algebraically to said command signal.

8. A power control system as claimed in claim 6 wherein that system further comprises ramp generator means for sensing the A.C. input signal applied to said motor and for generating a voltage ramp in timed relation to said A.C. signal, and wherein said control circuit means includes a first operational amplifier including one input to which said phase difference output signal and said power factor command signal are applied and a second operational amplifier, having a first input connected to receive said voltage ramp and a second input connected to the output of said first operational amplifier, for producing, at the output thereof, said control pulses, said feedback means comprising a connection between the output of said second operational amplifier and said one input of said first operational amplifier.

9. A power control system as claimed in claim 6 wherein said means for producing said first signal comprises means for sensing the voltage waveform of said switching means and for producing said first signal responsive thereto.

10. A power control system as claimed in claim 9 wherein said thyristor switching means comprises at least one triac and wherein said voltage waveform sensing means senses the voltage across said at least one triac.

* * * * *